United States Patent
Al-Duwaish

(10) Patent No.: US 8,190,536 B2
(45) Date of Patent: May 29, 2012

(54) METHOD OF PERFORMING PARALLEL SEARCH OPTIMIZATION

(75) Inventor: Hussain Nasser Al-Duwaish, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 931 days.

(21) Appl. No.: 12/232,092

(22) Filed: Sep. 10, 2008

(65) Prior Publication Data
US 2010/0063946 A1 Mar. 11, 2010

(51) Int. Cl.
*G06F 15/16* (2006.01)
*G06F 15/00* (2006.01)
*G06F 17/00* (2006.01)
*G06E 1/00* (2006.01)
*G06E 3/00* (2006.01)
*G06G 7/00* (2006.01)
*G06N 99/00* (2010.01)
*G06N 5/00* (2010.01)

(52) U.S. Cl. .............................. 706/10; 709/201; 706/45
(58) Field of Classification Search .................... 706/10, 706/14, 48, 45; 709/201
See application file for complete search history.

(56) References Cited

U.S. PATENT DOCUMENTS

| 4,745,758 | A | 5/1988 | Putman et al. |
| 4,888,953 | A | 12/1989 | Fukayama et al. |
| 5,347,466 | A | 9/1994 | Nichols et al. |
| 5,517,424 | A | 5/1996 | Marcelle et al. |
| 5,873,251 | A | 2/1999 | Iino |
| 5,886,895 | A | 3/1999 | Kita et al. |
| 6,021,402 | A | 2/2000 | Takriti |
| 6,532,454 | B1 | 3/2003 | Werbos |
| 6,681,155 | B1 | 1/2004 | Fujita et al. |
| 7,082,345 | B2 | 7/2006 | Shanmugasundram et al. |
| 2004/0030414 | A1* | 2/2004 | Koza et al. ................... 700/1 |
| 2004/0123600 | A1* | 7/2004 | Brunell et al. ................ 60/773 |
| 2005/0267608 | A1* | 12/2005 | Nishira et al. ................ 700/44 |
| 2006/0111881 | A1* | 5/2006 | Jackson ....................... 703/2 |

(Continued)

FOREIGN PATENT DOCUMENTS
WO WO 2007/016474 A2 2/2007

OTHER PUBLICATIONS

Cantú-Paz,E. "A Survey of Parallel Genetic Algorithms". 1998. 30 pages.*

(Continued)

*Primary Examiner* — Jeffrey A Gaffin
*Assistant Examiner* — Benjamin Buss
(74) *Attorney, Agent, or Firm* — Richard C. Litman

(57) ABSTRACT

The method of performing parallel search optimization includes the steps of: providing a master computer and N slave computers; randomly generating L possible solutions to a computerized process on the master computer; transmitting L/N possible solutions to each slave computer; and simulating the computerized process on each of the slave computers for each respective set of L/N possible solutions. The results of each simulation are transmitted to the master computer, and a set of solutions within a threshold are selected. The master computer determines if a single solution is an optimal solution to the process, and if a single optimal solution is found, the single optimal solution is utilized by the master computer as an input to the process, but if a single optimal solution is not found, the selected set of solutions is divided and transmitted to the slave computers to repeat the method from the step of simulation.

3 Claims, 2 Drawing Sheets

U.S. PATENT DOCUMENTS

| | | | | |
|---|---|---|---|---|
| 2006/0230018 A1* | 10/2006 | Grichnik et al. | | 707/2 |
| 2007/0055392 A1* | 3/2007 | D'Amato et al. | | 700/44 |
| 2008/0140749 A1* | 6/2008 | Amato et al. | | 708/490 |
| 2008/0222061 A1* | 9/2008 | Soetjahja | | 706/13 |
| 2010/0036064 A1* | 2/2010 | Leffew et al. | | 526/60 |

OTHER PUBLICATIONS

Moon, J. et al. "Parallel Hybrid Algorithm for Process Flexibility Analisys" Ind. Eng. Chem. Res. 20008, 47, pp. 8324-8336. Published online Sep. 25, 2008.*

Lim, D. et al. "Efficient Hierarchical Parallel Genetic Algorithms using Grid computing" Future Generation Computer Systems 23 (2007) pp. 658-670. Available online Nov. 28, 2006.*

Stützle, T. "Parallelization Strategies for Ant Colony Optimization" Lecture Notes in Computer Science, 1998, vol. 1498/1998, pp. 722-731, DOI:10.1007/BFb0056914.*

Watson, L.T. et al. "A Fully Distributed Parallel Global Search Algorithm" 14 pages. 2001.*

Berger, J. et al. "A parallel hybrid genetic algorithm for the vehicle routing problem with time windows" Computers & Operations Research 31 (2004) pp. 2037-2053.*

Nusyirwan, I.F. "Parallel Evolutionary Programming Techniques for Strategy Optimisation in Air Combat Scenarios" Thesis. RMIT University. Mar. 2008.*

* cited by examiner

METHOD OF PERFORMING PARALLEL SEARCH OPTIMIZATION

BACKGROUND OF THE INVENTION

1. Field of the Invention

The present invention relates to a method of performing parallel search optimization for a computerized process. Particularly, the method allows for avoidance of the ill-conditioning problem for matrix-based computerized processes in model predictive controllers.

2. Description of the Related Art

In numerical analysis, the condition number associated with a problem is a measure of that problem's amenability to digital computation; i.e., how numerically well-posed the problem is. A problem with a low condition number is said to be "well-conditioned", while a problem with a high condition number is said to be "ill-conditioned".

For example, the condition number associated with the linear equation $Ax=b$ gives a bound on how inaccurate the solution x will be after approximate solution. It should be noted that this is before the effects of round-off error are taken into account. Conditioning is a property of the matrix, not the algorithm or floating point accuracy of the computer used to solve the corresponding system. In particular, the condition number is, to a rough estimate, the rate at which the solution x will change with respect to a change in b. Thus, if the condition number is large, even a small error in b may cause a large error in x. Conversely, if the condition number is small, then the error in x will not be much bigger than the error in b.

The condition number is defined more precisely to be the maximum ratio of the relative error in x divided by the relative error in b. Letting e be the error in b, then the error in the solution $A^{-1}b$ is $A^{-1}e$. The ratio of the relative error in the solution to the relative error in b is:

$$\frac{\|A^{-1}e\|/\|A^{-1}b\|}{\|e\|/\|b\|}.$$

This may be transformed to:

$$\frac{\|A^{-1}e\|}{\|e\|} \cdot \frac{\|b\|}{\|A^{-1}b\|}.$$

The maximum value (for nonzero b and e) k is given by the product of the two operator norms, $k(A)=\|A^{-1}\|\cdot\|A\|$. The same definition is used for any consistent norm. This number is referred to as the condition number of a matrix.

Condition numbers for singular-value decompositions, polynomial root findings, eigenvalues and many other problems may be defined. Generally, if a numerical problem is well-posed, the problem can be expressed as a function f mapping its data, which is an m-tuple of real numbers x, into its solution, with an n-tuple of real numbers f(x).

Its condition number is then defined to be the maximum value of the ratio of the relative errors in the solution to the relative error in the data, over the problem domain:

$$\max\left\{\left|\frac{f(x)-f(x^*)}{f(x)}\right|\bigg/\left|\frac{x-x^*}{x}\right|:|x-x^*|<\varepsilon\right\},$$

where $\varepsilon$ is some reasonably small value in the variation of data for the problem. If f is also differentiable, then the above is approximately:

$$\left|\frac{f'(x)}{f(x)}\right|\cdot|x|.$$

The present invention is particularly directed towards model predictive control (MPC), which represents a family of model-based controllers. These controllers are used to manipulate process inputs to move the outputs of the process to be controlled to some desired targets. MPC controllers use the model of the process to be controlled to predict its future behavior. The future model outputs are calculated from the model:

$$Y=AU$$

where Y is an N×1 vector for the future outputs, A is an N×M matrix of the parameters representing the process model, and U is an M×1 vector representing future inputs. To find the future inputs U that will move the process outputs Y closer to their target output R, the following equation is used:

$$U=(A^TA)^{-1}A^T(R-Y)$$

This inverse-based controller becomes sensitive to input uncertainties and plant-model mismatch, along with co-linear outputs. The matrix $A^TA$ may be ill-conditioned, which will result in large control inputs U. This ill-conditioning has to be checked at each sampling time and a corrective action has to be taken before inverting the matrix. Typical methods used for controlling this problem include the Singular Value Thresholding (SVT) technique and Move Suppression (MS) methods. The SVT method involves discarding the singular values of the process model below a certain threshold. This method solves the ill-conditioning problem at the expense of neglecting the smallest singular values. The MS method is an ad hoc method, where the magnitude of the diagonal elements of the matrix $A^TA$ to be inverted are increased, removing the ill-conditioning.

Although effective, there is a need for a better method for checking for ill-conditioning at each sampling time and taking a corrective action before inverting the matrix in a model predictive controller. Thus, a method of performing parallel search optimization solving the aforementioned problems is desired.

SUMMARY OF THE INVENTION

The method of performing parallel search optimization provides for more efficient checking for ill-conditioning at each sampling time and taking a corrective action before inverting the matrix in a model predictive control system. The method includes the steps of: providing a master computer and N slave computers in communication with the master computer, where N is a plural integer; randomly generating L possible solutions to a computerized process on the master computer, where L is an integer multiple of N; dividing the L possible solutions by N and transmitting L/N possible solutions to each of the N slave computers; and simulating the computerized process on each of the N slave computers for each of the respective set of L/N possible solutions.

The results of each simulation are then transmitted to the master computer, and a set of solutions within a pre-set threshold are selected by the master computer. The master computer determines if a single solution in the selected set of solutions is an optimal solution to the computerized process, and if a single optimal solution is found, the single optimal solution is utilized by the master computer as an input to the computerized process. If a single optimal solution is not found, the selected set of solutions is divided into N equal subsets and transmitted to the N slave computers to repeat the method of performing parallel search optimization from the step of simulating the computerized process. The method of performing parallel search optimization may then be repeated at a subsequent sampling time.

Preferably, prior to the step of randomly generating L possible solutions, the master computer reads current process outputs of the computerized process, and then transmits the current process outputs to the N slave computers. The current process outputs are compared to pre-set model values, and are corrected for mismatches between the current process outputs and the pre-set model values.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed towards a method of performing parallel search optimization. Particularly, the inventive method allows for avoidance of the ill-conditioning problem for matrix-based processes, and more efficient checking for ill-conditioning at each sampling time and taking a corrective action before inverting the matrix in a model predictive control system. The method, as will be described in greater detail below, computes the input U without matrix inversion. The method is implemented using a cluster of computers in a master-slave configuration in order to deal with processes with fast dynamics.

Figure 1:
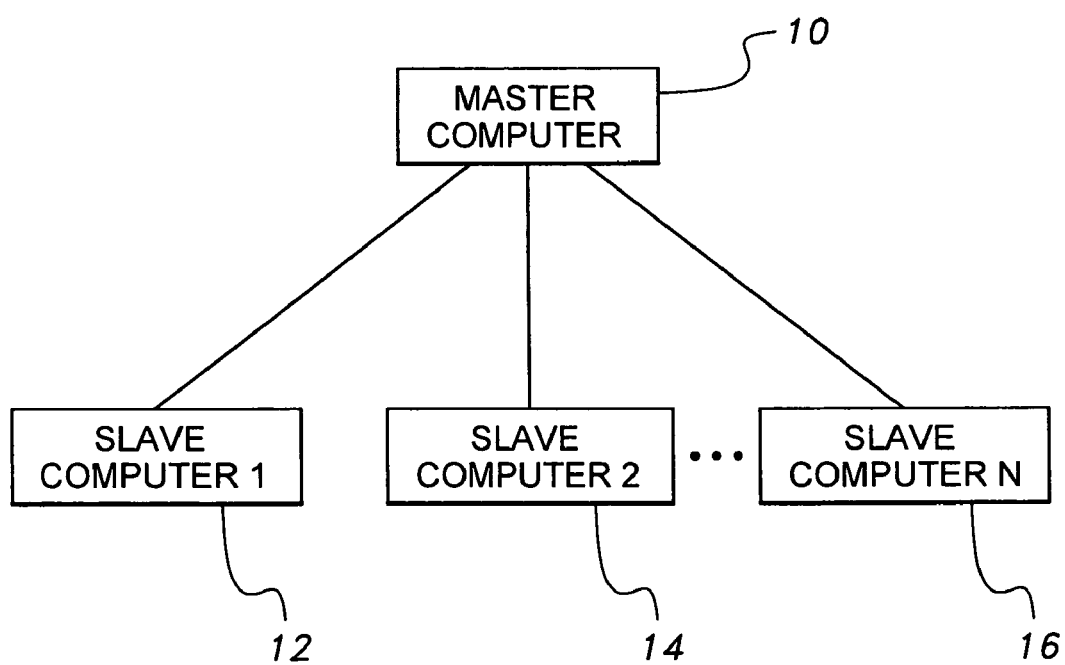
FIG. 1 is a block diagram of a system for implementing the method of performing parallel search optimization according to the present invention.

FIG. 1 shows a system for implementing the method. Master computer 10 is in communication with N slave computers (where N is a relatively large number). First Slave computer 12, second slave computer 14 and the $N^{th}$ slave computer 16 are shown for exemplary purposes only, though it should be understood that master computer 10 is in communication with all slave computers from first slave computer 12 to $N^{th}$ slave computer 16. Each slave computer stores a model of the process and receives a set of inputs from the master computer 10 for simulation only. The master computer 10 coordinates the simulations at the slave computers and handles communications with the process.

Figure 2:
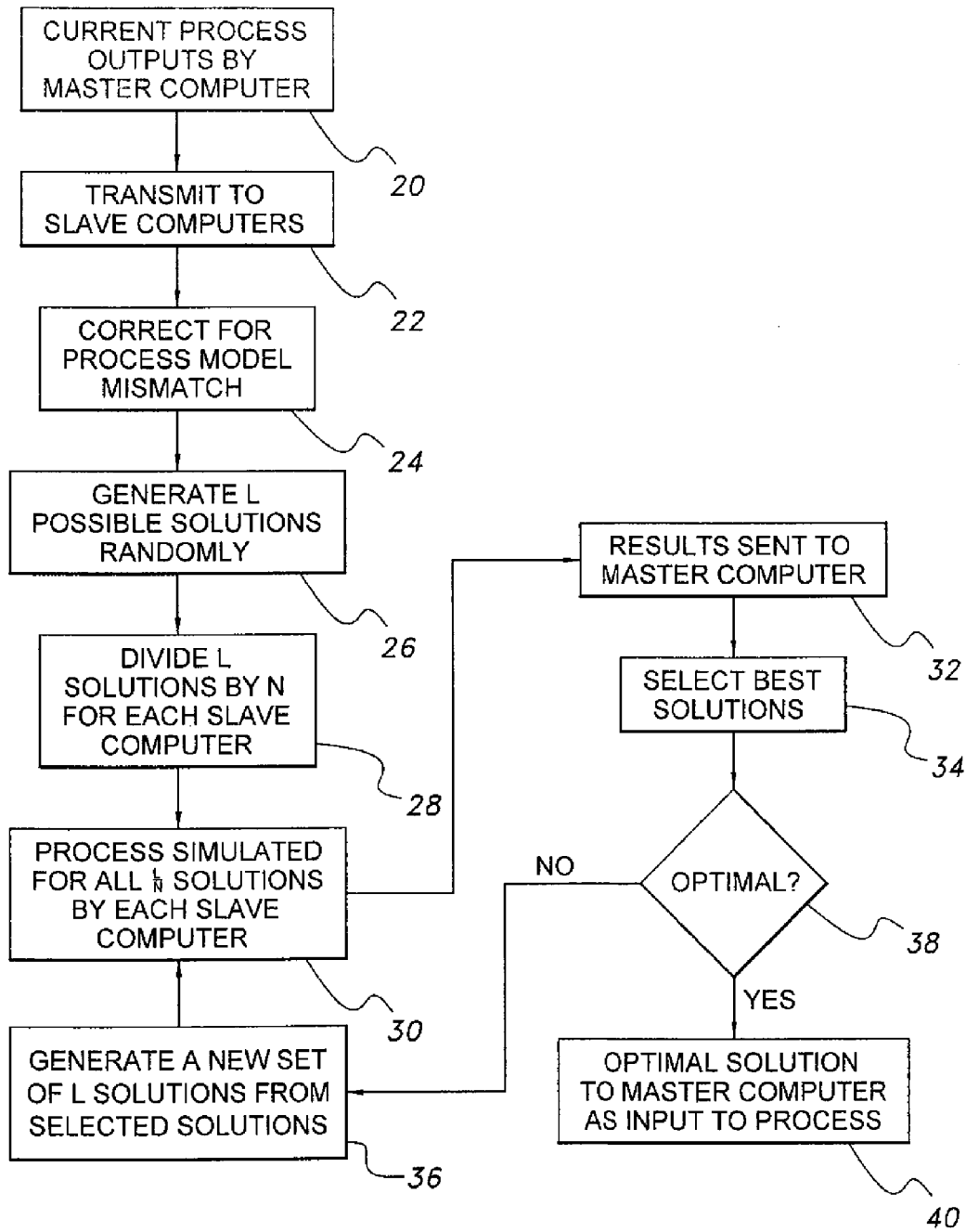
FIG. 2 is a flowchart illustrating the steps in a method of performing parallel search optimization according to the present invention.

As shown in FIG. 2, the method begins with the reading of current process outputs by the master computer 10 (step 20). These readings are then sent to the slave computers 12-16 (step 22) to correct for process-model mismatch (step 24).

L possible solutions are next generated randomly for the process inputs within the constraints of each input by the master computer 10 (step 26). At step 28, the L possible solutions are divided equally among slave computers 12-16. The process is then simulated for all L/N solutions by each of the N slave computers (step 30).

At step 32, the results of the simulation are sent from the slave computers 12-16 to the master computer 10 to compare the results and select the best solutions (step 34). The master computer 10 then generates a new set of L solutions based on the selected solutions using any suitable optimization method, such as genetic optimization algorithms or particle swarm optimization (step 36).

Steps 28 to 36 are then repeated until an optimal solution is found (with the decision of optimal condition taking place at step 38). When an optimal solution is found, the optimal solution is sent by the master computer 10 as an input to the process to be controlled (step 40). At the next sampling time, the process, from steps 20 to 40, may be repeated.

It is to be understood that the present invention is not limited to the embodiment described above, but encompasses any and all embodiments within the scope of the following claims.

I claim:

1. A method of performing parallel search optimization, comprising the steps of:
   (a) in a sampling time period, randomly generating L possible solutions to a computerized model predictive control process on a master computer, wherein L is an integer multiple of N;
   (b) dividing the L possible solutions into N groups of possible solutions;
   (c) transmitting the N groups of possible solutions to N slave computers, one of the N groups being assigned to each of the N computers, respectively;
   (d) simultaneously simulating the computerized process on each of the N slave computers, whereby each of the N groups of possible solutions is simulated simultaneously;
   (e) transmitting the results of each of the simulations to the master computer;
   (f) selecting a set of solutions within a pre-set threshold, the selecting being performed by the master computer;
   (g) determining if a single solution in the selected set of solutions is an optimal solution to the computerized model predictive control process on the master computer, wherein the optimal solution is not ill-conditioned with respect to the computerized model predictive control process;
   (h) if a single optimal solution is found, then using the single optimal solution as an input to the computerized process on the master computer; and
   (i) if a single optimal solution is not found, dividing the selected set of solutions into N equal subsets, transmitting the N equal subsets to the N slave computers, and repeating steps (d) through (h).

2. The method of performing parallel search optimization as recited in claim 1, further comprising the steps of:
   (j) reading current process outputs of the computerized process by the master computer;
   (k) transmitting the current process outputs to the N slave computers;
   (l) comparing the current process outputs to pre-set model values; and
   (m) correcting for mismatches between the current process outputs and the pre-set model values, steps (j) through (m) being performed prior to step (a).

3. The method of performing parallel search optimization as recited in claim 2, further comprising the step of repeating steps (a) through (m) at a subsequent sampling time period.

* * * * *